Patented July 14, 1953

2,645,641

UNITED STATES PATENT OFFICE 2,645,641

SOLUBLE ONIUM SALTS OF HALOGENMETHYLATED ARYLAMINOPOLYCYCLIC QUINONES

Edgar E. Renfrew, Phillipsburg, N. J., and David I. Randall, Easton, Pa., assignors to General Aniline & Film Corporation, New York, N. Y., a corporation of Delaware No Drawing. Application December 20, 1950, Serial No. 201,869

5 Claims. (Cl. 260—272)

This invention relates to the manufacture of new dyestuffs from the halogenmethyl derivatives of arylaminopolycyclic quinones of the anthanthrone, dibenzpyrene quinone, and pyranthrone series.

In a co-pending application, Serial No. 201,868, filed December 20, 1950, there are described the halogenmethyl derivatives of arylaminopolycyclic quinones of the anthanthrone, dibenzpyrene quinone, and pyranthrone series. It was pointed out in that application that the halogenmethyl derivatives have utility as dyes when used in a vatting process, and that these halogenmethyl derivatives have particular utility as intermediates for the preparation of soluble dyes. It is to the preparation of these soluble dyes that this application is directed.

A halogenmethyl derivative of an arylaminopolycyclic quinone of the anthanthrone, dibenzpyrenequinone, or pyranthrone series may be converted to a soluble quaternary dye by reacting the halogenmethylated compound with a thiourea compound or a tertiary amine. The reaction proceeds in accordance with one of the following equations:

(1)
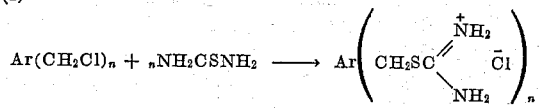

(2) $Ar(CH_2Cl)_n + {}_nN(CH_3)_3 \longrightarrow Ar(CH_2\overset{+}{N}(CH_3)_3\bar{Cl})_n$ wherein Ar is the radical of an arylamino-anthanthrone, -dibenzpyrene quinone, or -pyranthrone compound and $n$ is a number from 1 to 4. The thiourea of reaction 1 may be replaced by thiourea derivatives such as 1-allylthiourea, 1-methylthiourea, 1-phenylthiourea, 1,3-dimethylthiourea, 1,3-ethylenethiourea, 1,1,3-trimethylthiourea, and 1,1,3,3-tetramethylthiourea. The trimethyl amine of reaction 2 may be replaced by tertiary amines such as diethylaminoethyl alcohol, triethylamine, and benzyldimethylamine, and by cyclic amines such as pyridine, picoline, isoquinoline, and quinoline.

The isothiouronium salts of the chloromethylated arylamino - anthanthrone, -dibenzpyrene quinone, and -pyranthrone compounds are prepared by heating a mechanically stirred mixture of the chloromethylated arylamino-anthanthrone, -dibenzpyrene quinone, or -pyranthrone compound and thiourea or a thiourea derivative under reflux for a period of about one-half hour. The reaction mixture is then diluted with acetone or water, filtered and slurried or washed with acetone. The product is dried by exposure to air. The resulting dyes are water-soluble and are substantive to paper, cotton, silk, nylon, and wool. They may be paste-printed on cotton, silk, and nylon, and developed by vat or acid aging methods well known to the art. The isothiouronium salts of the arylamino-anthanthrone, -dibenzpyrene quinone, and -pyranthrone chloromethyl derivatives may be represented by the formula:

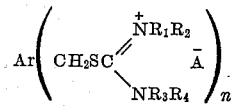

wherein Ar is the radical of a dibenzanthronyl, dibenzanthrone, or isodibenzanthrone compound, $R_1$, $R_2$, $R_3$, and $R_4$ are members of the group consisting of alkyl, alkylene, aryl, and hydrogen, of which $R_2$ and $R_4$ may together form a closed ring system; $n$ is an integer from 1 to 4; and A indicates a negative ion, such as chlorine, bromine, or sulfate.

The N-methylene quaternary salts of the chloromethylated arylaminoanthanthrone, -dibenzpyrene quinone, and -pyranthrone compounds are prepared by heating a mixture of the chloromethylated arylaminopolycyclic quinone with a tertiary amine, e. g., trimethylamine or pyridine. After heating for several hours, the reaction mixture is diluted with acetone, filtered, and washed with acetone until the tertiary amine odor has been removed. The resulting dye is readily soluble in water. These N-methylene quaternary salts of the chloromethylated polycyclic quinones may be represented by the following formulae:

(1)    $Ar(CH_2\overset{+}{N}Q_1Q_2Q_3\bar{A})_n$ (2)    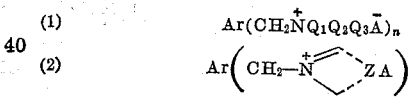

wherein Ar has the same meaning as above; $Q_1$, $Q_2$, and $Q_3$ are members of the group consisting of alkyl, alkylol, and alkaryl; Z indicates the C atoms necessary to complete a 6-membered ring system; A and $n$ have the same meaning as above. Print dyeings may be made from these N-methylene quaternary salts of the chloromethylated arylamino-anthanthrones, -dibenzpyrene quinones, and -pyranthrones in the same manner as in the case of the isothiouronium quaternary salts of the said chloromethylated compounds and will dye directly from aqueous solutions. Although the N-methylene quaternary salts are less fast to light than the isothiouronium salts, the former nevertheless are fast to chlorine and washing. Both the isothiouronium and N-methylene quaternary salts have also shown utility as bactericides, fungicides, and insecticides.

Of the isothiouronium salts of the chloromethylated arylamino-anthanthrone, -dibenzpyrene quinone, and -pyranthrone compounds, those which are derived from trimethyl- and tetramethylthiourea are preferred. Bright shades having excellent fastness to chlorine, washing, and light are obtained when printing these isothiouronium salts of the chloromethylated arylaminopolycyclic quinone compounds.

As starting materials for the production of the isothiouronium and N-methylene quaternary salts, the class of chloromethylated arylamino-anthanthrone, -dibenzpyrene quinone, and -pyranthrone compounds described in said copending application may be employed. Examples of such starting materials are the mono- and di-chloromethyl derivatives of mono- and di-anilino-, -p-toluidino-, and -p-chlorophenyl-amino-anthanthrone and -dibenzpyrene quinone as represented by the composite formulae:

(1) anthanthrone

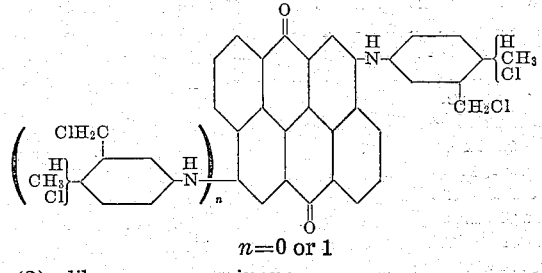

$n=0$ or $1$ (2) dibenzpyrene quinone

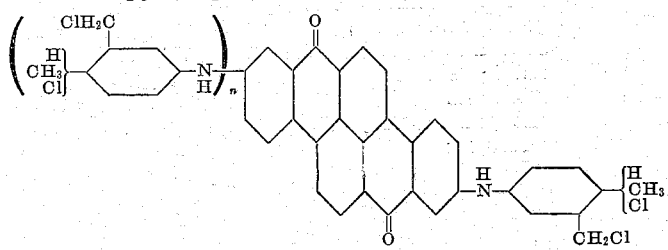

$n=0$ or $1$ and the amino-, di-, tri-, and tetra-chloromethyl derivatives of mono-, di-, tri-, and tetra-anilino, -p-toluidino, and -p-chlorophenylamino-pyranthrone of the following composite formula:

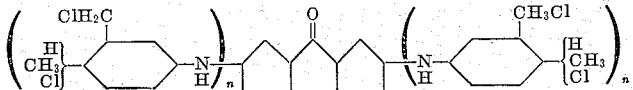
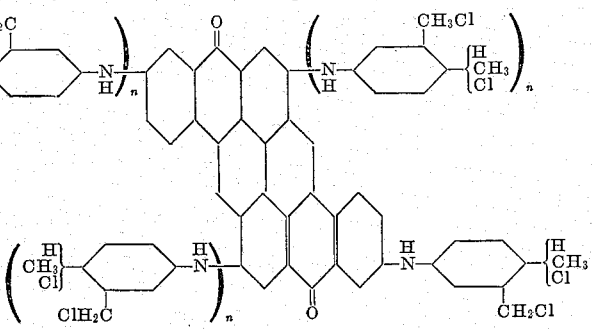

$n=0$ or $1$

The products of the chloromethylation process of said copending application generally contain one chloromethyl substitution on each arylamino component present. Where there is but one arylamino component, there may also be chloromethyl substitutions on the anthanthrone, dibenzpyrene quinone, or pyranthrone nucleus. Such products may be readily converted to the isothiouronium or N-methylene quaternary salts of the chloromethyl compound by the process of this application.

The following examples will serve to further illustrate the invention, but it is not intended that they should be considered as limitations on the scope of the invention. Unless otherwise stated, the parts are by weight.

*Example 1*

Ninety-two parts finely divided bis-(m-chloromethyl-p-toluidino) anthanthrone, 47.0 parts 1,1,3-trimethylthiourea, and 250.0 parts water were mixed intimately and warmed at steam temperature for one-quarter hour. The smooth paste which resulted was stirred with 2800.0 parts acetone. The suspended material was isolated by filtration and air dried. It weighed 100.0 parts.

The freely water soluble product yielded attractive reddish-brown shades when printed on cotton; the properties were good, especially to washing. Paper pulp dyed with the material showed excellent resistance to bleeding. The dye may be represented by the following structural formula:

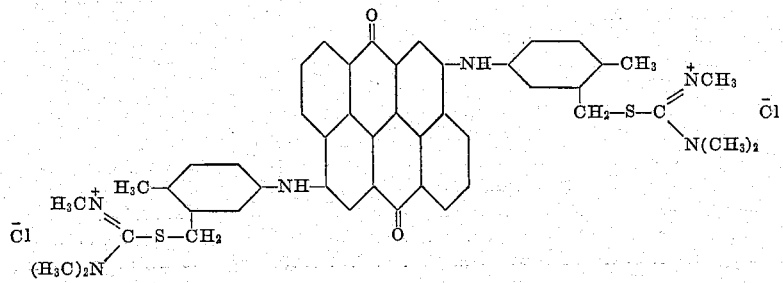

1,3 - dimethylthiourea and ethylenethiourea when substituted in equivalent amounts for 1,1,3-trimethylthiourea give soluble isothiouronium compounds of similar properties.

*Example 2*

Sixty-two parts finely divided tetrakis (m-chloromethyl - p - toluidino) - pyranthrone, 47.0 parts 1,1,3-trimethylthiourea, and 250.0 parts water were mixed intimately and warmed at steam temperature for one-quarter hour. The smooth paste which resulted was stirred with 2800.0 parts acetone. The suspended material was isolated by filtration and air dried. It weighed 80.0 parts.

toluidino) dibenzpyrene quinone; 47.0 parts 1,1,3-trimethylthiourea, and 250.0 parts water were mixed intimately and warmed at steam temperature for one-quarter hour. The smooth paste which resulted was stirred with 2800.0 parts acetone. The suspended material was isolated by filtration and air dried. It weighed 105.0 parts.

The freely water soluble product yielded attractive reddish-brown shades when printed on cotton; the properties were good, especially to washing. Paper pulp dyed with the material showed excellent resistance to bleeding. The dye may be represented by the following structural formula:

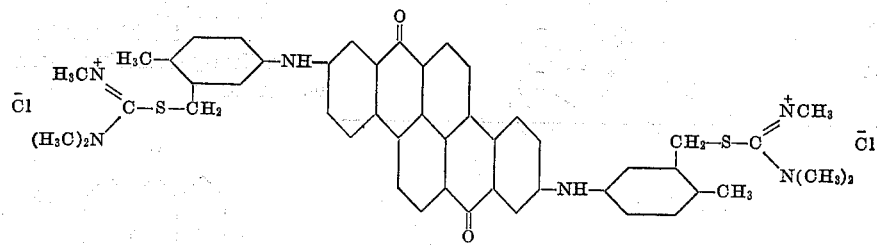

The freely water soluble product yielded attractive reddish-brown shades when printed on cotton; the properties were good, especially to washing. Paper pulp dyed with the material showed excellent resistance to bleeding. The dye may be represented by the following structural formula:

1,3 - dimethylthiourea and ethylenethiourea when substituted in equivalent amounts for 1,1,3-trimethylthiourea give soluble isothiouronium compounds of similar properties.

*Example 4*

One hundred parts of bis(m-chloromethyl-p-toluidino) anthanthrone was warmed in 1000.0 parts pyridine at steam temperatures. The sol-

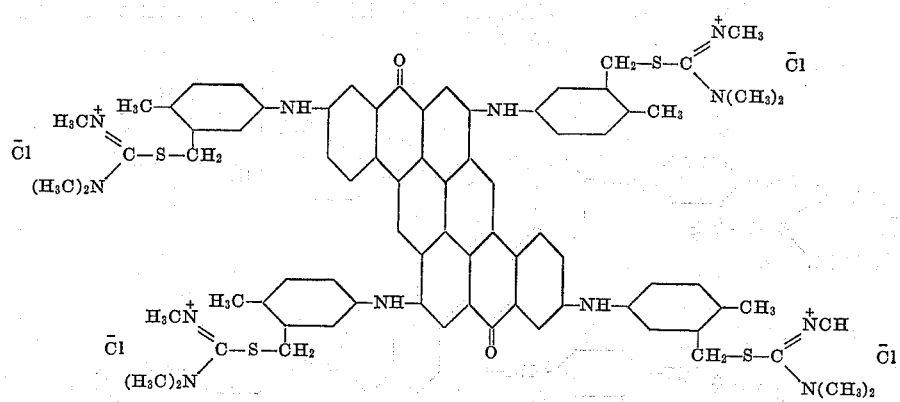

1,3-dimethylthiourea and ethylenethiourea when substituted in equivalent amounts for 1,1,3-trimethylthiourea give soluble isothiouronium quaternary salts of similar properties.

vent was removed by evaporation. The powder which remained was soluble in water. It prints cotton reddish-brown shades from an aqueous solution. It may be represented by the following formula:

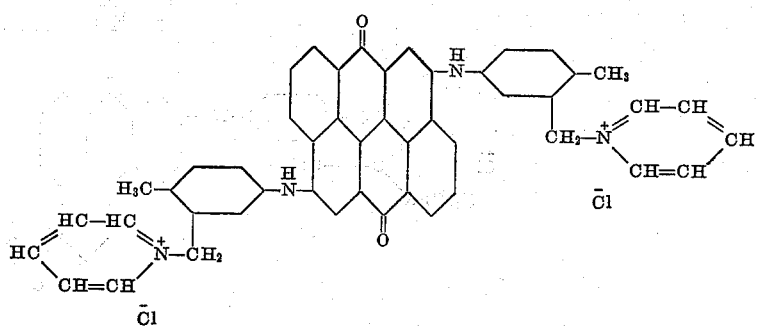

*Example 3*

Ninety-six parts of bis(m-chloromethyl-p-

Equivalent parts of the tetrakis (m-chloromethyl-p-toluidino) pyranthrone of Example 2 and the bis(m-chloromethyl-p-toluidino) dibenzpyrene quinone of Example 3 may be substituted for the bis(m-chloromethyl-p-toluidino)

anthanthrone of this example to obtain corresponding pyridinium quaternary salts of the chloromethylated dyes.

Trimethylamine may be substituted for the pyridine of this example in order to produce the corresponding trimethyl quaternary ammonium salts.

We claim:

1. The soluble onium salts of halogenmethyl derivatives of vat dyes of the class consisting of those having the formulae:

(1) 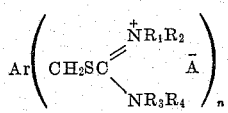

(2) 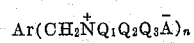

(3) 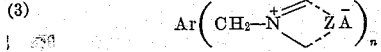

wherein Ar is a radical selected from the group consisting of arylamino-anthanthronyl, arylamino-dibenzpyrene quinonyl, and arylamino pyranthronyl radicals and is joined to the remainder of the molecule through the aryl group of the arylamino radical, $R_1$, $R_2$, $R_3$, and $R_4$ are members of the group consisting of alkyl, alkylene, aryl, and hydrogen, of which $R_2$ and $R_4$ may together form a closed ring system; $Q_1$, $Q_2$, and $Q_3$ are members of the group consisting of alkyl, alkylol, and alkaryl; Z indicates the C atoms necessary to complete a 6-membered ring system; $\bar{A}$ indicates a negative ion; and $n$ is an integer from 1 to 4.

2. The isothiouronium salt of bis-(m-chloromethyl-p-toluidino) anthanthrone having the formula:

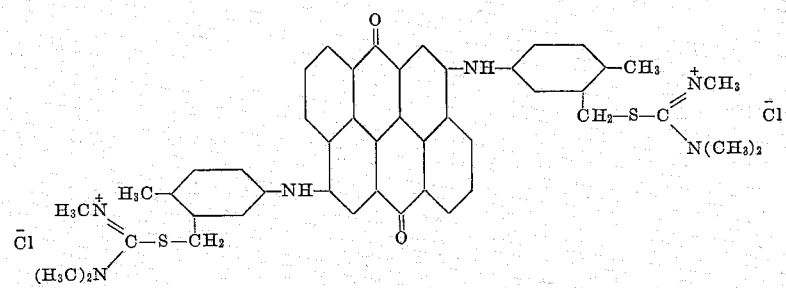

3. The isothiouronium salt of tetrakis (m-chloromethyl-p-toluidino)-pyranthrone having the formula:

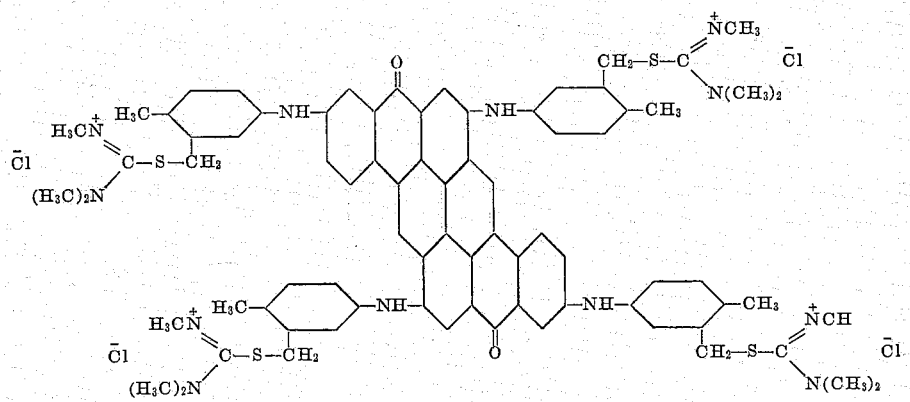

4. The isothiouronium salt of bis-(m-chloromethyl-p-toluidino) dibenzpyrene quinone having the formula:

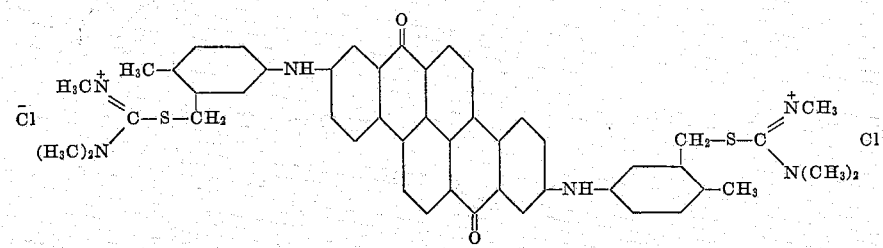

5. The pyridinium salt of bis-(m-chloromethyl-p-toluidino) anthanthrone having the formula:
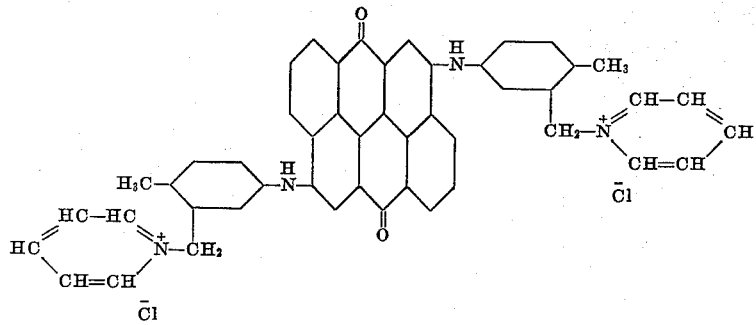
EDGAR E. RENFREW.
DAVID I. RANDALL.
References Cited in the file of this patent
UNITED STATES PATENTS
| Number | Name | Date |
| --- | --- | --- |
| 2,036,705 | Kunz et al. | Apr. 7, 1936 |
| 2,544,825 | Coffey et al. | Mar. 13, 1951 |
FOREIGN PATENTS
| Number | Country | Date |
| --- | --- | --- |
| 613,982 | Great Britain | Dec. 7, 1948 |
| 613,983 | Great Britain | Dec. 7, 1948 |